(12) United States Patent
Keller

(10) Patent No.: US 10,875,467 B2
(45) Date of Patent: Dec. 29, 2020

(54) HOLDER FOR FLAT, APPROXIMATELY RECTANGULAR DEVICES SUCH AS TABLET COMPUTERS OR SMARTPHONES

(71) Applicant: Kinetix AG, Chur (CH)

(72) Inventor: Michael Andreas Keller, Freudenstadt (DE)

(73) Assignee: KINETIX AG, Churschweiz (CH)

( * ) Notice: Subject to any disclaimer, the term of this patent is extended or adjusted under 35 U.S.C. 154(b) by 0 days.

(21) Appl. No.: 16/603,865

(22) PCT Filed: Mar. 29, 2018

(86) PCT No.: PCT/EP2018/058050
§ 371 (c)(1),
(2) Date: Oct. 9, 2019

(87) PCT Pub. No.: WO2018/188961
PCT Pub. Date: Oct. 18, 2018

(65) Prior Publication Data
US 2020/0114833 A1    Apr. 16, 2020

(30) Foreign Application Priority Data
Apr. 11, 2017 (DE) .................. 10 2017 107 842

(51) Int. Cl.
*B60R 11/02* (2006.01)
*B60R 11/00* (2006.01)

(52) U.S. Cl.
CPC ...... *B60R 11/0235* (2013.01); *B60R 11/0241* (2013.01); *B60R 11/0252* (2013.01); *B60R 2011/0085* (2013.01)

(58) Field of Classification Search
CPC ............ B60R 11/0235; B60R 11/0241; B60R 11/0252; B60R 2011/0085;
(Continued)

(56) References Cited

U.S. PATENT DOCUMENTS 8,584,916 B1 * 11/2013 Chen ...................... A45F 5/021
224/199
8,727,192 B2 * 5/2014 Lai ...................... F16M 13/022
224/420
(Continued)

FOREIGN PATENT DOCUMENTS

DE      102011116097 A1    3/2013
DE      102012217802 A1    4/2014
(Continued)

OTHER PUBLICATIONS

English language Abstract of DE202015007168.
(Continued)

*Primary Examiner* — Adam J Waggenspack
(74) *Attorney, Agent, or Firm* — Ware, Fressola, Maguire & Barber LLP

(57) ABSTRACT

A holder (10) for detachably fastening a flat, approximately rectangular device such as a tablet computer or a smartphone to a component, in particular to a component of a motor vehicle, wherein the holder includes a holding device (12) for detachably mounting the device and a fastening element (14) connected to the holding device for connecting the holder to the component, wherein a rotary bearing rotatable about an axis of rotation (24) is provided, which is connected to the holding device and wherein a pivot bearing connected to the rotary bearing is provided, which is connected to the fastening element.

20 Claims, 3 Drawing Sheets

(58) Field of Classification Search
CPC ..... Y10T 403/32327; Y10T 403/32352; Y10T 403/32368; Y10T 16/5402; Y10T 16/54021; Y10T 16/54028; Y10T 16/54029; Y10T 16/540295; Y10T 403/32541; G05G 5/06; G05G 5/065; G05G 5/16; G05G 5/22; F16M 11/041; F16M 11/105; F16M 11/2021; F16M 13/00; F16M 13/022; H04M 1/02
USPC ............... 224/197–200, 282; 74/473.26, 527
See application file for complete search history.

(56) References Cited

U.S. PATENT DOCUMENTS

| | | | |
|---|---|---|---|
| 2012/0145843 A1 | 6/2012 | Ho et al. | |
| 2013/0068908 A1 | 3/2013 | Bury | |
| 2015/0329209 A1 | 11/2015 | Muirhead | |
| 2017/0237843 A1* | 8/2017 | Ackeret | H04B 1/3888 |
| | | | 455/575.9 |

FOREIGN PATENT DOCUMENTS

| | | |
|---|---|---|
| DE | 202015007168 U1 | 11/2015 |
| DE | 102016102611 A1 | 8/2017 |
| EP | 2437960 B1 | 6/2010 |
| EP | 2528781 B1 | 3/2011 |
| WO | 2010139452 A1 | 12/2010 |

OTHER PUBLICATIONS

English language Abstract unavailable for DE102011116097A1.
English language abstract of corresponding document US20130068908.
English language Abstract unavailable for DE102012217802A1.
English language abstract of corresponding document US20150329209A1.
English language Abstract of DE102016102611.
English language Abstract unavailable for EP2437960B1. English language abstract of corresponding document WO2010139452A1.
English language Abstract of EP2528781.

* cited by examiner

HOLDER FOR FLAT, APPROXIMATELY RECTANGULAR DEVICES SUCH AS TABLET COMPUTERS OR SMARTPHONES

The invention relates to a holder for detachably fastening a flat, approximately rectangular device such as a tablet computer or a smartphone to a component, in particular to a component of a motor vehicle, wherein the holder includes a holding device for detachably mounting the device and a fastening element, which is connected to the holding device for connecting the holder to the component, wherein a rotary bearing rotatable about an axis of rotation is provided, which is connected to the holding device and wherein a pivot bearing connected to the rotary bearing is provided, which is connected to the fastening element.

Such holders are known from the prior art, for example, from EP 2 528 781 B1. In such a holder known from the prior art, the rotary bearing is connected to the pivot bearing indirectly via a second rotary bearing, wherein a type of "connecting rod approach" may be implemented, by means of which the holder or the device situated on the holder may be pivoted between two positions of use. It is conceivable in this case to fasten this holder in a socket of a motor vehicle by means of a fastening element designed for such purpose, or to fasten the holder to the headrest rods of a motor vehicle, for example, indirectly by means of a fastening device provided for such purpose.

However, these holders have been found to be disadvantageous in part, particularly when fastened to the headrest rods, especially in the case of large, new generation tablet computers which, when viewed from above, often have a size that exceeds the area of a DIN-A4 sheet. On the one hand, a placement of the tablet computer in a portrait orientation may be prevented due to the proximity to the vehicle roof or to the headliner due to the "connecting rod".

On the other hand, the new, especially large tablet computers have display sizes of 13 inches and more. This size of the tablet computer also affects the mass of tablet computers, which also increases. In the event of a crash, the long lever arm of the connecting rod known from EP 2 528 781 B1 is disadvantageous due to the greater mass. The unpublished German patent application DE 10 2016 102 611.5 describes a holder without such a connecting rod, in which radially movable locking elements are biased radially inward by an annular spring into a locking position, in which a rotation of a rotary bearing is prevented, wherein the locking elements are movable against the spring force into a release position, in which a rotation of the rotary bearing is enabled.

The object of the invention is therefore to provide a holder for detachably fastening a flat, approximately rectangular device such as a tablet computer or a smartphone to a component, in particular, to a component of a motor vehicle, with which larger tablet computers may be stably and securely fastened and which is easy and cost-effective to manufacture.

This problem is solved by a holder having the features of claim 1. Advantageous refinements are cited in the subclaims.

The holder according to the invention is characterized in that the rotary bearing includes a first rotary bearing portion connected to the holding device and a second rotary bearing portion connected to the fastening element, wherein a spring washer is provided on the rotary bearing which has spring arms integrally connected to the spring washer, with locking sections, which are movable between a radially inner locking position and a radially outer release position perpendicular to the axis of rotation of the rotary bearing, wherein the first rotary bearing portion is rotatable relative to the second rotary bearing portion in the release position and wherein the first rotary bearing portion is fixed in the locking position relative to the second rotary bearing portion, wherein the spring washer is designed and situated in such a way that the locking sections are biased radially inward into the lock position by means of the spring arms. The first and the second rotary bearing portions advantageously slide on each other about the rotary bearing during rotation. It is conceivable that the spring washer is formed from a spring steel. By providing such a spring washer, an overall very simple, space-saving, cost-effective and stable construction of the holder may be implemented.

In a first advantageous refinement of the holder, it is provided that the holding device has a receptacle for the device and holding elements situated in the area of the receptacle for mounting the device, and that the first rotary bearing portion is situated on the side of the holding device facing away from the receptacle. The first rotary bearing portion is advantageously connected directly to the holding device, but in any case is rotationally fixedly connected to the holding device, for example, screw-connected.

A connecting element is advantageously provided, wherein the second rotary bearing portion is situated on the connecting element and wherein the connecting element has pivot bearing sections of the pivot bearing. It is also conceivable that pivot bearing counter-sections are provided on the fastening element, wherein the pivot bearing sections and the pivot bearing counter-sections correspond to each other in such a way that the pivot bearing is designed as a friction bearing.

It is further advantageous if the first rotary bearing portion is formed as a cone, wherein the second rotary bearing portion is formed as a counter-cone. It has proven to be particularly advantageous if the cone and the counter-cone have an identical angle of inclination relative to the axis of rotation of the rotary bearing and are situated coaxially to each other, so that the cone and the counter-cone are able to slide on each other during rotation for implementing the rotary bearing.

In order to enable an adjustment of a tablet computer or a smartphone from portrait to landscape orientation or vice versa and to lock the holder in the respective position, it has proven to be particularly advantageous if multiple, preferably 4, locking grooves are provided on the first rotary bearing portion, which are situated at regular intervals from each other over the circumference of the first rotary bearing portion. If 4 locking grooves are provided, it is particularly advantageous if the locking grooves are each situated at an angle of 90° to each other. If 4 locking grooves are situated at an angle of 90° to each other, then only an adjustment from portrait to landscape orientation is possible. If more than 4 locking grooves are provided at smaller angular intervals, locking in intermediate positions may also be enabled.

According to one particularly advantageous refinement of the holder, it is provided that the locking sections correspond to the locking grooves in such a way that the locking sections are moved at least partially into the locking grooves in the locking position. Thus, it is conceivable, for example, that the locking grooves have a locking groove profile, wherein the locking sections are formed as ball sections situated on the spring arms.

In this case, it has proven to be particularly advantageous, if the locking grooves and the locking sections have a profile which is designed in such a way that a rotation of the first rotary bearing portion relative to the second rotary bearing portion results in a movement of the locking section from the locking position into the release position against the spring force of the spring arms. According to one advantageous refinement of the holder, the locking grooves are formed as V-grooves, wherein the locking sections include ball sections situated on the spring arms. A rotation of the first rotary bearing portion relative to the second rotary bearing portion thus results in a sliding of the V-grooves and of the spherical locking sections toward one other in the circumferential direction. As a result of this sliding in the circumferential direction, the spherical locking sections are forced radially outward (i.e., perpendicular to the axis of rotation of the rotary bearing) against the spring force of the spring arms and thus release the locking grooves again, so that the locking sections are moved from the locking position into the release position.

In a particularly cost-effective and at the same time stable embodiment of the holder, multiple, preferably 4, locking sections are provided, which are situated in mirror image to the axis of rotation. It is conceivable in this case that the locking sections are situated on a total of 4 spring arms, which extend radially outward at an angular separation of 90° to each other.

It has proven to be particularly advantageous if the spring washer has an annular base portion, from which the spring arms extend radially outward.

It is further advantageous if the spring washer is rotationally fixedly connected to the second rotary bearing portion. Thus, the spring washer is unable to be rotated relative to the rotary bearing portion.

It has proven to be particularly preferred if the spring washer includes multiple, preferably 4, locking sections which extend radially inward. The locking sections are then advantageously situated at an angle of 90° to each other and engage in counter-locking sections of the second rotary bearing portion in such a way that a rotation of the spring washer relative to the second rotary bearing portion is prevented.

Additional details and advantageous refinements of the invention may be found in the following description, on the basis of which an embodiment of the invention is explained and described in greater detail.

In which.

Figure 1:
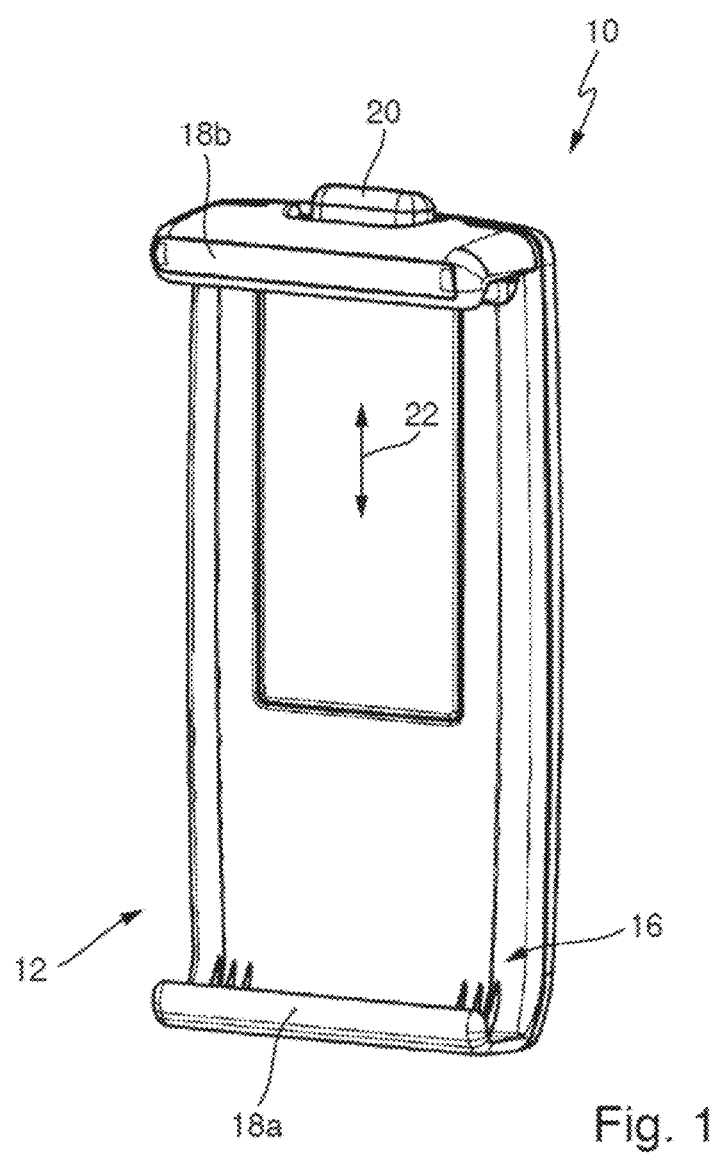
FIG. 1 shows a front perspective view of a holder according to the invention.
Figure 2:
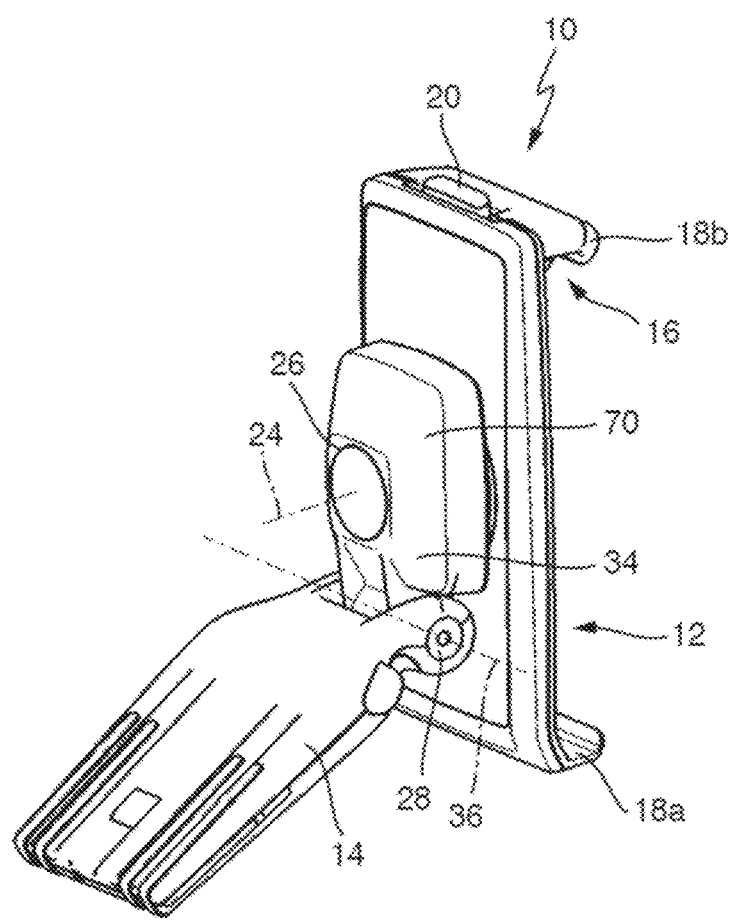
FIG. 2 shows a rear perspective view of the holder according to FIG. 2.

In all, a holder 10 according to the present invention for detachably fastening a flat, approximately rectangular device not shown in the figures, such as a tablet computer or a smartphone to a component, in particular to a component of a motor vehicle, is shown in the FIGS. 1 through 4. FIG. 1 shows the holder 10 in a front perspective view, wherein the holder 10 is shown in FIG. 2 in a rear perspective view.

The holder 10 comprises a holding device 12 for detachably mounting the device and a fastening element 14 for connecting the holder 10 to the component, for example with a socket provided for such purpose in a motor vehicle or with a fastening device known from EP 2 437 960 B1 for connection to two spaced apart headrest rods of a vehicle seat.

The holding device 12 includes a receptacle 16 for the device and clip-like holding elements 18a, 18b situated in the area of the receptacle 16 for mounting the device. As is clearly apparent in FIGS. 1 and 2, the holding device 12 further includes in an upper area a push button 20, by means of which a movement of the holding elements 18a, 18b relative to each other in the direction of the double arrow 22 and, accordingly, a size adaptation of the holding device 12 is enabled. However, the holding device 12 is the subject matter of another patent application and will not be explained in further detail here.

The holder 10 includes a rotary bearing 26 rotatable about an axis of rotation 24 (see FIGS. 2 through 4), which is connected to the holding device 12. The holder 10 further includes a pivot bearing 26 connected to the rotary bearing 28, which is connected to the fastening element 14.

The rotary bearing 26 includes a first rotary bearing portion 30 fixedly connected to the holding device 12, which is situated on the side of the holding device 12 facing away from the receptacle 16. The rotary bearing 26 further includes a second rotary bearing portion 32 connected to the fastening element 14. The holder 10 includes a connecting element 34, wherein the second rotary bearing portion 32 is situated on the connecting element 34 and wherein the connecting element 34 includes pivot bearing sections of the pivot bearing 28. The pivot bearing 28 rotates about a pivot bearing axis of rotation 36 (see FIG. 2), which is situated perpendicular to the axis of rotation 24 of the rotary bearing 26.

The first rotary bearing portion 30 is designed as a cone and the second rotary bearing portion 32 is designed as a counter-cone. The two cones of the rotary bearing portions 30, 32 are situated coaxially to the axis of rotation 24 of the rotary bearing 26. Provided on the first rotary bearing portion 30 are four locking grooves 38, which are situated over the circumference of the first rotary bearing portion 30, each at an angle of 90° to each other. The locking grooves 38 are designed as V-grooves.

Figure 3:
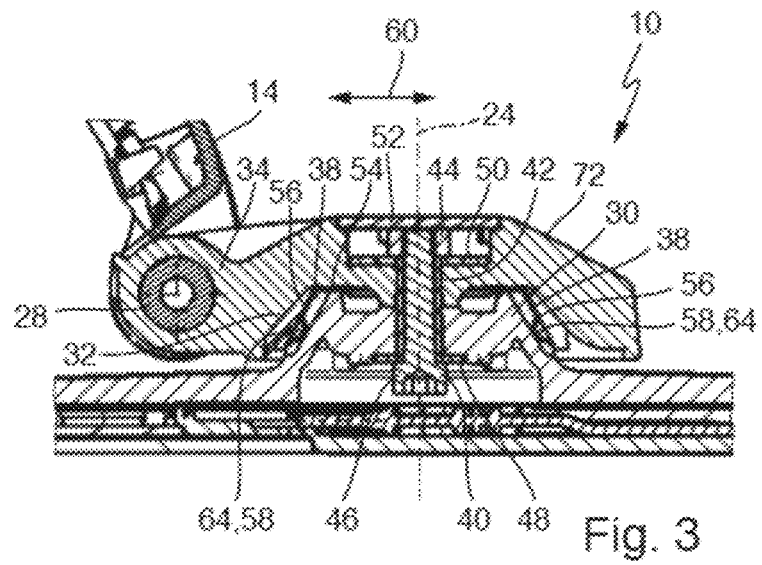
FIG. 3 shows a detail of a section through the holder according to FIGS. 1 and 2.

As is apparent, in particular, in the section according to FIG. 3, the two rotary bearing portions 30, 32 are connected to one another by means of a screw 40, which is passed through a sleeve 42, and through a nut 44. The screw 40 and the nut 44 are situated coaxially to the axis of rotation 24 of the rotary bearing 26 and are also shown in the exploded view of FIG. 4. Two washers 48, 50 are also provided in the screw connection under a screw head 46 of the screw 40 and under the nut 44, wherein the nut 44 is covered by a circular cover 52 in the area of the connecting element 34.

In order to enable a locking of the rotary bearing 26 and of the first rotary bearing portion 30 relative to the second rotary bearing portion 32, a spring washer 54 made of a spring steel is provided on the rotary bearing 26 perpendicular to the axis of rotation 24. The spring washer 54 includes spring arms 56 situated at an angle of 90° to each other and in mirror image to the axis of rotation 24, with locking sections 58 that are movable perpendicular to the axis of rotation 24 of the rotary bearing 26 between a radially inner locking position and a radially outer release position in the direction of the double arrows 60, 62.

In the release position of the spring arms 56, the two rotary bearing portions 30, 32 are rotatable relative to each other, wherein the rotary bearing portions 30, 32 are fixed relative to each other when the spring arms 56 are in the locking position.

Figure 4:
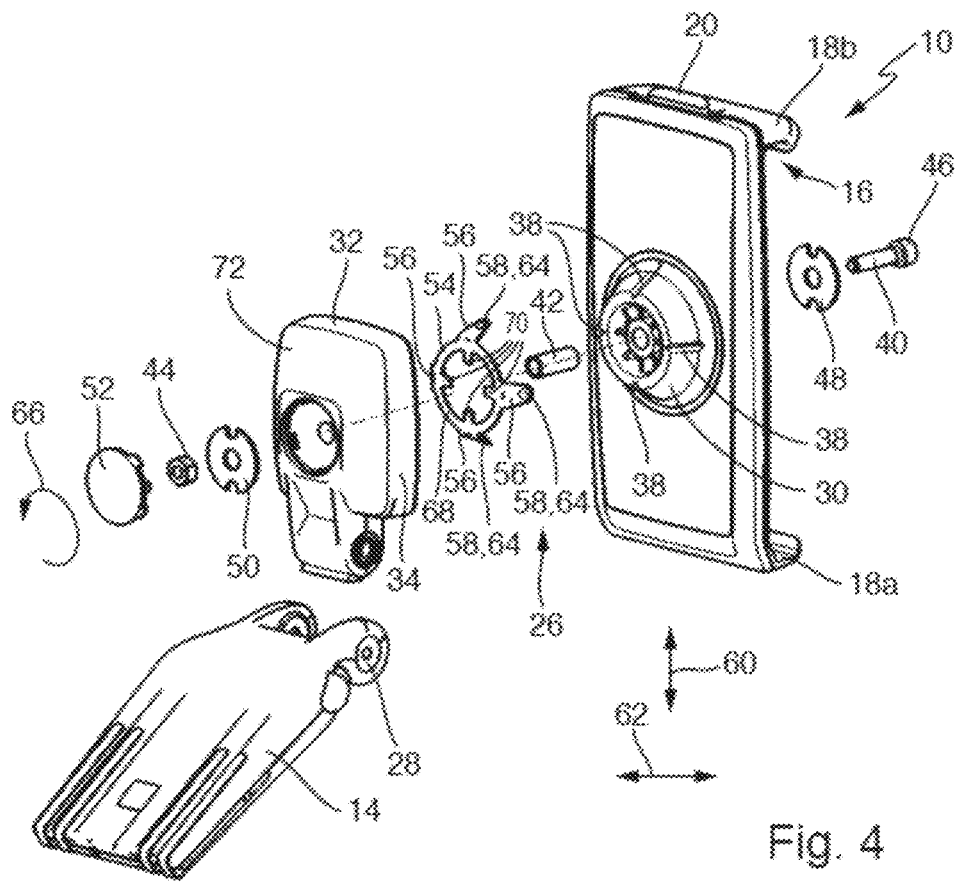
FIG. 4 shows a partially exploded view of components of the holder according to FIGS. 1 and 2.

To lock the two rotary bearing sections 30, 32, the locking sections 58 in FIGS. 3 and 4 have clearly recognizable ball sections 64 which correspond to the locking grooves 38 in such a way that the locking sections 58 or the ball sections 64 are moved at least partially into the locking grooves 38 in the locking position. The locking sections 58 and the ball sections 64 are each situated at a free end of the spring arms 56, so that a total of four locking sections 58 or ball sections 64 are provided.

The locking sections 58 or the ball sections 64 and the locking grooves 38 have a profile, which is designed in such a way that a rotation of the first rotary bearing portion 30 relative to the second rotary bearing portion 32 in the direction of the arrow 66 results in a movement of the locking sections 58 of the spring washer 54 or the spring arms 56 from the locking position into the release position against the spring force of the spring arms 56.

The spring washer 54 includes an annular base portion 68, from which the spring arms 56 extend radially outward. The spring arms 56 are bent at an angle from the base portion 68 in such a way that they extend approximately in parallel to the cone of the first rotary bearing portion 30.

The spring washer 54 further includes four locking sections 70, which extend from the base portion 68 radially inward and are also situated at an angle of 90° to each other. These locking sections 70 engage in counter-locking sections of the second rotary bearing portion 32, which are not shown in the figures, in such a way that a rotation of the spring washer 54 relative to the second rotary bearing portion 32 is prevented.

Since the locking grooves 38 have a V-shaped profile with inclined surfaces, and since the locking sections 58 include the ball sections 64, a rotation of the first rotary bearing portion 30 relative to the second rotary bearing portion 32 in the direction of arrow 66 by a sliding of the inclined surfaces of the locking grooves 38 and the ball sections 64 or locking sections 58 toward each other results in a movement of the locking sections 58 and the spring arms 56 into the release position against the spring force of the spring arms 56.

The rotary bearing 26, which is part of the connecting element, is protected as a whole with a cover 72 from contamination.

With a holder 10 according to the invention, it is possible on the one hand to also provide a particularly stable fastening option for tablet computers having a size of more than 13 inches due to the direct connection of the rotary bearing 26 to the holding device 12. On the other hand, due to the locking sections 58, which are acted upon by the spring arms 56 of the spring washer 54 in the locking position, and due to the four locking grooves 38, a simple, cost-effective and secure option for locking the holder 10 in a portrait orientation and a landscape orientation is implemented.

The invention claimed is:

1. A holder (10) for detachably fastening a flat, approximately rectangular device such as a tablet computer or a smartphone to a component, in particular to a component of a motor vehicle, wherein the holder (10) has a holding device (12) for detachably mounting the flat, approximately rectangular device and a fastening element (14) connected to the holding device (12) for connecting the holder (10) to the component, wherein a rotary bearing (26) rotatable about an axis of rotation (24) is provided which is connected to the holding device (12), and wherein a pivot bearing (28) connected to the rotary bearing (26) is provided, which is connected to the fastening element (14), characterized in that the rotary bearing (26) includes a first rotary bearing portion (30) connected to the holding device (12) and a second rotary bearing portion (32) connected to the fastening element (14), wherein a spring washer (54) is provided on the rotary bearing (26), wherein the spring washer (54) includes spring arms (56) integrally connected with the spring washer (54), with locking sections (58) which are moveable perpendicular to the axis of rotation (24) of the rotary bearing (26) between a radially inner locking position and a radially outer release position, wherein the first rotary bearing portion (30) is rotatable in the radially outer release position relative to the second rotary bearing portion (32), wherein the first rotary bearing portion (30) is fixed in the radially inner locking position relative to the second rotary bearing portion (32), and wherein the spring washer (54) is designed and situated in such a way that the locking sections (58) are biased radially inward into the radially inner locking position by means of the spring arms (56).

2. The holder (10) according to claim 1, characterized in that the holding device (12) includes a receptacle (16) for the flat, approximately rectangular device and holding elements (18a, 18b) situated in the area of the receptacle (16) for holding the flat, approximately rectangular device, and that the first rotary bearing portion (30) is situated on the side of the holding device (12) facing away from the receptacle (16).

3. The holder (10) according to claim 1, characterized in that a connecting element (34) is provided, wherein the second rotary bearing portion (32) is situated on the connecting element (34), and wherein the connecting element (34) includes pivot bearing sections of the pivot bearing (28).

4. The holder (10) according to claim 1, characterized in that the first rotary bearing portion (26) is formed as a cone, and wherein the second rotary bearing portion (32) is formed as a counter-cone.

5. The holder (10) according to claim 1, characterized in that multiple locking grooves (38), including 4 locking grooves (38), are provided on the first rotary bearing portion (30), which are situated over the circumference of the first rotary bearing portion (30) at regular intervals from each other.

6. The holder (10) according to claim 5, characterized in that the locking sections (58) correspond to the multiple locking grooves (38) in such a way that the locking sections (58) are at least partially moved into the multiple locking grooves (38) in the radially inner locking position.

7. The holder (10) according to claim 6, characterized in that the multiple locking grooves (38) and the locking sections (58) have a profile designed so that a rotation of the first rotary bearing portion (30) relative to the second rotary bearing portion (32) results in a movement of the locking sections (58) from the radially inner locking position into the radially outer release position against the spring force of the spring arms (56).

8. The holder (10) according to claim 1, characterized in that multiple locking sections (58), including locking sections (58), are provided, which are situated in mirror image to the axis of rotation (28).

9. The holder (10) according to claim 1, characterized in that the spring washer (54) has an annular base portion (70) from which the spring arms (56) extend radially outward.

10. The holder (10) according to claim 1, characterized in that the spring washer (54) is rotationally fixedly connected to the second pivot bearing portion (32).

11. The holder (10) according to claim 10, characterized in that the spring washer (54) includes multiple locking sections (70), including 4 locking sections (70), which extend radially inward.

12. The holder (10) according to claim 2, characterized in that a connecting element (34) is provided, wherein the second rotary bearing portion (32) is situated on the connecting element (34), and wherein the connecting element (34) includes pivot bearing sections of the pivot bearing (28).

13. The holder (10) according to claim 2, characterized in that the first rotary bearing portion (26) is formed as a cone, wherein the second rotary bearing portion (32) is formed as a counter-cone.

14. The holder (10) according to claim 2, characterized in that multiple locking grooves (38), including 4 locking grooves (38), are provided on the first rotary bearing portion (30), which are situated over the circumference of the first rotary bearing portion (30) at regular intervals from each other.

15. The holder (10) according to claim 3, characterized in that the first rotary bearing portion (26) is formed as a cone, wherein the second rotary bearing portion (32) is formed as a counter-cone.

16. The holder (10) according to claim 3, characterized in that multiple, preferably, 4 locking grooves (38) are provided on the first rotary bearing portion (30), which are situated over the circumference of the first rotary bearing portion (30) at regular intervals from each other.

17. The holder (10) according to claim 2, characterized in that multiple locking sections (58), including 4 locking sections (58), are provided, which are situated in mirror image to the axis of rotation (28).

18. The holder (10) according to claim 2, characterized in that the spring washer (54) has an annular base portion (70) from which the spring arms (56) extend radially outward.

19. The holder (10) according to claim 2, characterized in that the spring washer (54) is rotationally fixedly connected to the second pivot bearing portion (32).

20. The holder (10) according to claim 3, characterized in that multiple locking sections (58), including 4 locking sections (58), are provided, which are situated in mirror image to the axis of rotation (28).

* * * * *